United States Patent
Hihara et al.

(10) Patent No.: US 7,097,670 B2
(45) Date of Patent: Aug. 29, 2006

(54) YELLOW DISPERSE DYE MIXTURE WHICH HAS A HIGH LEVEL OF LIGHT FASTNESS

(75) Inventors: Toshio Hihara, Fukuoka (JP); Hiroshi Inoue, Fukuoka (JP); Wataru Seto, Fukuoka (JP)

(73) Assignee: DyStar Textilfarben GmbH & Co. Deutschland KG, (DE)

( * ) Notice: Subject to any disclaimer, the term of this patent is extended or adjusted under 35 U.S.C. 154(b) by 0 days.

(21) Appl. No.: 10/523,656

(22) PCT Filed: Aug. 2, 2003

(86) PCT No.: PCT/EP03/08582

§ 371 (c)(1),
(2), (4) Date: Mar. 15, 2005

(87) PCT Pub. No.: WO2004/018567

PCT Pub. Date: Mar. 4, 2004

(65) Prior Publication Data

US 2005/0272920 A1 Dec. 8, 2005

(30) Foreign Application Priority Data

Aug. 8, 2002 (JP) ............... 2002-231524

(51) Int. Cl.
*C09B 67/38* (2006.01)
*D06P 3/36* (2006.01)
(52) U.S. Cl. .................. 8/639; 8/638; 8/922
(58) Field of Classification Search .......... 8/638, 8/639
See application file for complete search history.

(56) References Cited

FOREIGN PATENT DOCUMENTS

| DE | 2 212 755 | | 9/1973 |
|---|---|---|---|
| DE | 2212755 | * | 9/1973 |
| EP | 0 551 903 | | 11/1996 |
| GB | 1105568 | | 3/1968 |
| GB | 1381693 | * | 1/1975 |
| JP | 4-24470 | | 4/1992 |
| JP | 6-345989 | | 12/1994 |
| JP | 2506594 | | 4/1996 |
| WO | WO-02/057353 | | 7/2002 |
| WO | WO-02/059215 | | 8/2002 |

* cited by examiner

*Primary Examiner*—Margaret Einsmann
(74) *Attorney, Agent, or Firm*—Connolly Bove Lodge & Hotz

(57) ABSTRACT

The present inventions refers to a dye mixture comprising from 25 to 80% by weight with respect to the total dyestuff fraction of the yellow dyestuff represented by the structural formula [1]

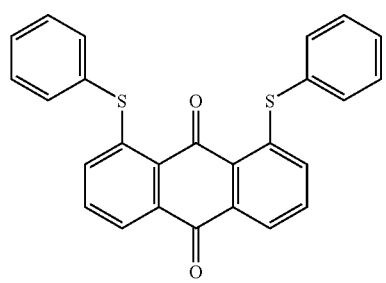

[1]

and from 75 to 20% by weight with respect to the total dyestuff fraction of a yellow dyestuff represented by the structural formula [2]

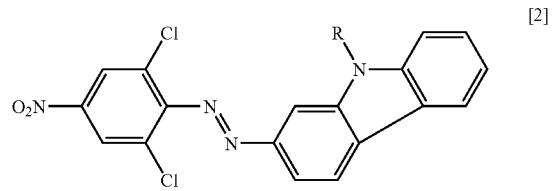

[2]

wherein R denotes a $C_1$ to $C_4$ hydroxyalkyl group.

7 Claims, No Drawings

YELLOW DISPERSE DYE MIXTURE WHICH HAS A HIGH LEVEL OF LIGHT FASTNESS

RELATED APPLICATIONS

This application is a national stage application (under 35 U.S.C. 371) of PCT/EP03/008582 filed Aug. 2, 2003 which claims benefit to Japanese application number 2002-231524 filed Aug. 8, 2002.

The present invention concerns disperse dyes, with which polyester-based fibers can be dyed a good yellow color, which have excellent light fastness and with which the dyeing temperature dependence is low.

Cloth comprising polyester fibers is often used as automobile seat material, but in recent years a demand has arisen as a result of the increasing importance of the fashion aspects of automobile interior decoration for a wider range of seat colors. However, automobile seats are often exposed to sunlight at high temperatures inside the enclosed cabin and so fading of the seat color is liable to occur and it is difficult to ensure that a good color will be retained over a prolonged period of time. Hence, dyes which have especially good light fastness must be used for dyeing the polyester fibers used for automobile seats.

However, in the past there were few yellow dyes which had especially good light fastness and a low dyeing temperature dependence, which is to say with which the reproducibility and temperature control at time of dyeing was achieved easily with a wide range of temperatures being suitable for dyeing, and hardly any yellow dyes which were satisfactory for automobile seat purposes had been found. For example, the dyestuff represented by structural formula [1] below is known from the disclosures of British Patent GB 1105568 and Japanese Examined Patent Publication Hei4-24470, but although this dyestuff is excellent in terms of its light fastness and can be used generally for dyeing polyester fibers in automobile seat applications, the dyeing temperature dependence is high and temperature control during dyeing is difficult. Furthermore, the dyestuffs which can be represented by the structural formula [2] mentioned below are known from the disclosures of DE-A 2212755 and Japanese Patent JP2506594 but, although these dyestuffs have a low dyeing temperature dependence, there is a problem with light fastness when they are used for automobile seat materials.

As a result of a thorough investigation based on an understanding of the situation described above carried out with a view to providing a yellow dye which has good light fastness and a low dyeing temperature dependence, and which is suitable for dyeing the polyester-based fibers which are used in automobile seat applications, the inventors have surprisingly found that the aforementioned objectives can be realized by means of the specified dye mixtures of this invention.

As a result of various investigations carried out with a view to providing a method whereby the dyeing temperature dependence can be reduced while retaining the excellent light fastness of the yellow dyestuff by structural formula [1] indicated below, the inventors have discovered that if a mixture with the dyestuff represented by the structural formula [1] indicated below of a dyestuff which can be represented by structural formula [2] indicated below, or with the further addition of the dyestuff represented by [3], is used, not only is the dyeing temperature dependence reduced when compared with the situation where the dyestuff represented by structural formula [1] indicated below is used alone, but there are cases where the light fastness is also increased, and the invention is based upon this discovery.

That is to say, the invention refers to a dye mixture comprising from 25 to 80% by weight with respect to the total dyestuff fraction of the yellow dyestuff represented by the structural formula [1]

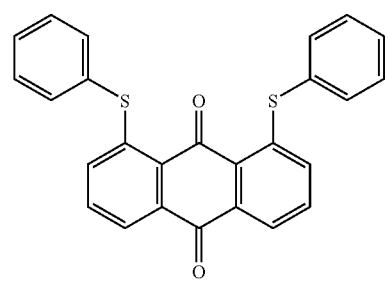

[1]

and from 75 to 20% by weight with respect to the total dyestuff fraction of a yellow dyestuff represented by the structural formula [2]

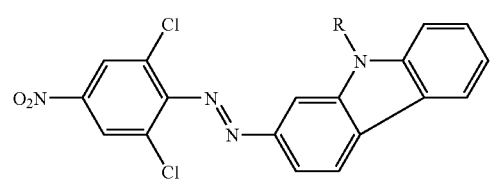

[2]

wherein R denotes a $C_1$ to $C_4$ hydroxyalkyl group.

The inventive mixture contains preferably from 50 to 70% by weight of the yellow dyestuff represented by the structural formula [1] and from 50 to 30% by weight of the yellow dyestuff represented by the structural formula [2].

In those cases where the proportion of the dyestuff of the formula [2] is too small the improving effect on the dyeing temperature dependence is small. Furthermore, conversely, in those cases where the amount of the dyestuff of the formula [2] is too great this results in a lowering of the light fastness.

In a preferred embodiment of the present invention the inventive mixture contains up to 20% by weight with respect to the total dyestuff fraction of the yellow dyestuff of the formula [3]

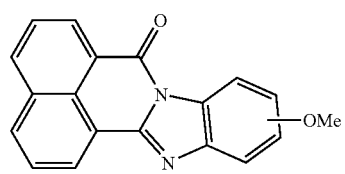

[3]

In an especially preferred embodiment of the present invention the inventive mixture contains 5 to 15% by weight with respect to the total dyestuff fraction of the yellow dyestuff of the formula [3].

Furthermore, the inventive mixture may contain red dyestuffs and blue dyestuffs in an amount to achieve dyeing of the desired color.

The inventive mixtures can easily be obtained by admixing the dyestuffs of the formulae [1], [2] and [3] in the desired amounts.

The dyestuffs of the formulae [1], [2] and [3] are insoluble or sparingly soluble in water and so a dye bath or a printing paste where they have been dispersed as fine particles in an aqueous medium using a condensate of naphthalene sulfonic acid and formaldehyde, a higher alcohol sulfuric acid ester, a higher alkylbenzene sulfonic acid salt or the like as a dispersing agent is prepared for dyeing polyester fibers using the dye mixture of the present invention and the dyeing can then be carried out by immersion dyeing or printing. For example, in the case of immersion dyeing, dyeing with excellent fastness can be achieved with polyester-based fibers or mixed weave products if the usual dyeing process methods such as the high temperature dyeing method, the carrier dyeing method, the thermosol dyeing method or such like method is used.

EXAMPLES 1 TO 7 AND COMPARATIVE EXAMPLES 1 AND 2

The dyestuffs of the formulae [1] and [3] and the dyestuffs of the formulae [2-1], [2-2] and [2-3]

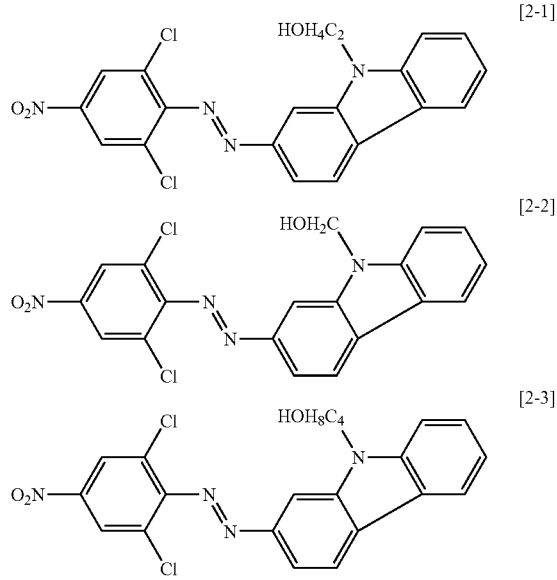

were mixed in the proportions disclosed in Table 1 below.

The dyestuff mixture (16 mg) and 49 mg of dispersing agent consisting of naphthalene sulfonic acid/formaldehyde condensate, higher alcohol sulfuric acid ester or the like were mixed together and the mixture was dispersed in 100 ml of water which contained dye promotor and acetic acid/sodium acetate pH buffer solution to prepare a dye bath, and 5 g of polyester cloth was immersed in this dye bath and dyed for 30 minutes at 135° C. and then reduction cleaning, rinsing with water and drying were carried out in the usual way and yellow dyed material was obtained.

The light fastness of the dyed material was evaluated in accordance with the Toyota Automobile Co. light fastness test specifications and the light fastness was good in Examples 1 to 7 according to the present invention. In Examples 1, 5 and 6 where the dyestuffs of the formulae [1] and [2] were mixed in the proportion of 55% by weight and 45% by weight, respectively, and in Example 7 where they were mixed in amounts of 65% by weight and 35% by weight, respectively, the light fastness was better than that in the case where the dyestuff of formula [1] had been used alone. Moreover, the light fastness test was carried out using a high energy xenon lamp fadometer from the Suga Test Machine Co. as the testing apparatus under conditions of radiation intensity 150 W/m$^2$ (300–400 nm), with a light/dark irradiation procedure including 38 cycles with an irradiation time of 3.8 hours and a dark time of 1 hour as 1 cycle at a black panel temperature of 73±3° C. The tests were carried out with the test cloths backed with urethane.

Then the dyeing temperature dependence was evaluated using the method outlined below. The same dyes as used earlier when evaluating light fastness were mixed in the proportions shown in Table 1. The dye mixture (29 mg) and 86 mg of dispersing agent consisting of naphthalene sulfonic acid/formaldehyde condensate, higher alcohol sulfuric acid ester or the like were mixed together and the mixture was dispersed in 100 ml of water which contained dye promotor and acetic acid/sodium acetate pH buffer solution to prepare a dye bath, and 5 g of polyester cloth was immersed in this dye bath and dyed for 30 minutes at 130° C. or for 30 minutes at 120° C. and then reduction cleaning, rinsing with water and drying were carried out in the usual way and dyed materials were obtained. The density of the dyed material obtained at 120° C. was compared with the density of the dyed material obtained at 130° C. and with the dyed materials of Examples 1 to 7 according to the invention the difference between the densities obtained on dyeing at 120° C. and on dyeing at 130° C. was small, showing that the dyeing temperature dependence was small. On the other hand, in the case of Comparative Example 1 where the dyestuff of formula [1] was used alone there was a marked difference in density and the dyeing temperature dependence was large, which is to say that reproducibility and temperature control when dyeing were difficult, the temperature range which was suitable for dyeing being narrow.

TABLE 1

|  | Example 1 | Example 2 | Example 3 | Example 4 | Example 5 | Example 6 | Example 7 | Comp. Ex. 1 | Comp. Ex. 2 |
| --- | --- | --- | --- | --- | --- | --- | --- | --- | --- |
| Dyestuff of Formula [1] % by weight | 55 | 80 | 25 | 55 | 55 | 55 | 65 | 100 | — |
| Dyestuff of Formula [2-1] % by weight | 45 | 20 | 75 | 30 | — | — | 35 | — | 100 |
| Dyestuff of Formula [2-2] % by weight | — | — | — | — | 45 | — | — | — | — |
| Dyestuff of Formula [2-3] % by weight | — | — | — | — | — | 45 | — | — | — |
| Dyestuff of Formula [3] % by weight | — | — | — | 15 | — | — | — | — | — |
| Light Fastness | 4–5 | 4 | 4 | 4–5 | 4–5 | 4–5 | 4–5 | 4 | 3–4 |
| ΣK/S ratio of density of dyed material obtained at 120° C. when the density of the dyed material obtained at 130° C. was taken to be 100 | 80 | 75 | 75 | 85 | 75 | 75 | 75 | 50 | 65 |

By means of this invention it is thus possible by mixing a dyestuff of the formula [2], or the dyestuff of the formula [3] in addition to this dyestuff, to the dyestuff of the formula [1] to obtain a yellow disperse dye mixture with which the dyeing temperature dependence is greatly improved while maintaining the good light fastness of the Dyestuff of the formula [1].

The invention claimed is:

1. Dye mixture comprising from 25 to 80% by weight with respect to the total dyestuff fraction of the yellow dyestuff represented by the structural formula [1]

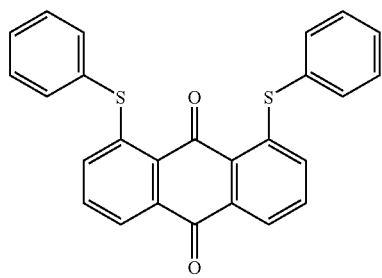

[1]

and from 75 to 20% by weight with respect to the total dyestuff fraction of a yellow dyestuff represented by the structure formula [2]

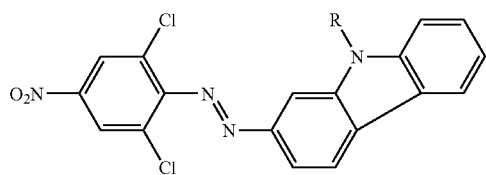

[2]

wherein R denotes a $C_1$ to $C_4$ hydroxyalkyl group.

2. Dye mixture according to claim 1 which contains from 50 to 70% by weight of the yellow dyestuff represented by the structural formula [1] and from 50 to 30% by weight of the yellow dyestuff represented by the structural formula [2].

3. Dye mixture according to claim 1 which further contains up to 15% by weight with respect to the total dyestuff fraction of the yellow dyestuff of the formula [3]

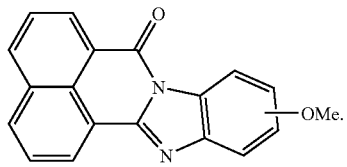

[3]

4. A method for dyeing polyester-based fibers in which a dyestuff mixture of claim 1 is used.

5. Dye mixture according to claim 2 which further contains up to 15% by weight with respect to the total dyestuff fraction of the yellow dyestuff of the formula [3]

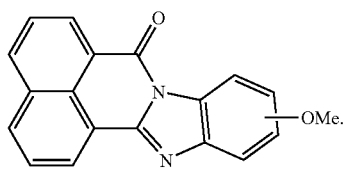

[3]

6. Dye mixture according to claim 3 wherein the yellow dyestuff of the formula [3] is present in an amount from 5 to 15% by weight with respect to the total dyestuff.

7. Dye mixture according to claim 5 wherein the yellow dyestuff of the formula [3] is present in an amount from 5 to 15% by weight with respect to the total dyestuff.

* * * * *

UNITED STATES PATENT AND TRADEMARK OFFICE
CERTIFICATE OF CORRECTION

| | |
|---|---|
| PATENT NO. | : 7,097,670 B2 |
| APPLICATION NO. | : 10/523656 |
| DATED | : August 29, 2006 |
| INVENTOR(S) | : Toshio Hihara et al. |

It is certified that error appears in the above-identified patent and that said Letters Patent is hereby corrected as shown below:

On the Title Page

Item (75), Inventors, "Toshio Hiraha, Fukuoka (JP), Hiroshi Inoue, Fukuoka (JP), Wataru Seto, Fukuoka (JP)" should read -- Toshio Hiraha, Fukuoka (JP), Hiroshi Inoue, Osaka (JP), Wataru Seto, Osaka (JP) --

In the Claims:

In Claim 1, at column 5, line 29, "structure formula [2]" should read -- structural formula [2] --

Signed and Sealed this

Twenty-third Day of January, 2007

JON W. DUDAS
*Director of the United States Patent and Trademark Office*